United States Patent [19]
Rahman et al.

[11] Patent Number: 5,478,994
[45] Date of Patent: Dec. 26, 1995

[54] SECURE CREDIT CARD WHICH PREVENTS UNAUTHORIZED TRANSACTIONS

[76] Inventors: Sam Rahman, 4809 Laurette St., Torrance, Calif. 90503; Jim Magner, 5092 Tripoli Ave., Los Alamitos, Calif. 90720; John Brown, 12831 Longden St., Garden Grove, Calif. 92645; Adarsh Pun, 5404 White Fox Dr., Rancho Palos Verdes, Calif. 90274; Grant Parker, 3996 Myra Ave., Los Alamitos, Calif. 90720

[21] Appl. No.: 274,252

[22] Filed: Jul. 13, 1994

[51] Int. Cl.$^6$ ................................................ G06K 5/00
[52] U.S. Cl. ................................................ 235/380
[58] Field of Search ........................ 235/380; 380/23, 380/24, 25, 46

[56] References Cited

U.S. PATENT DOCUMENTS

| | | | |
|---|---|---|---|
| 4,295,039 | 10/1981 | Stuckert | 235/380 |
| 4,630,201 | 12/1986 | White | 235/380 X |
| 4,694,412 | 9/1987 | Domenik et al. | 380/46 X |
| 4,772,782 | 9/1988 | Nonat | 235/380 |
| 4,786,790 | 11/1988 | Kruse et al. | 235/380 |
| 5,068,894 | 11/1991 | Hoppe | 380/46 X |
| 5,177,790 | 1/1993 | Hazard | 380/46 X |
| 5,180,902 | 1/1993 | Schick et al. | 235/380 |
| 5,208,447 | 5/1993 | Kruse | 235/380 |
| 5,367,572 | 12/1994 | Weiss | 380/23 |

*Primary Examiner*—Donald T. Hajec
*Assistant Examiner*—Michael G. Lee
*Attorney, Agent, or Firm*—John J. Connors; Connors & Associates

[57] ABSTRACT

A secure credit card 10 has a body member to which is attached a microprocessor controller 14 electrically coupled a Programmable Read Only Memory (PROM) device 18 programmed with a series of random numbers in a predetermined sequence. The random numbers are identical to random numbers in a host computer and in the identical sequence as the random numbers in the host computer. This computer is accessible upon each use of the credit card 10. The Programmable Read Only Memory (PROM) accesses the next random number in sequence with each use of the credit card 10 to permit verification by comparing the random number with each use of the credit card 10 with the next random number in sequence as indicated by the computer. A switch 20 actuated with each use of the credit card 10 provides a pulse signal that activates the microprocessor controller 14 to turn on the Programmable Read Only Memory (PROM) to access the next random number in the sequence. A counter 26 connected to the microprocessor controller 14 counts the number of pulse signals received to count each use of the credit card 10. A display device 24 displays the next Personal Identification Number (PIN) in the sequence each time a pulse is received.

1 Claim, 1 Drawing Sheet

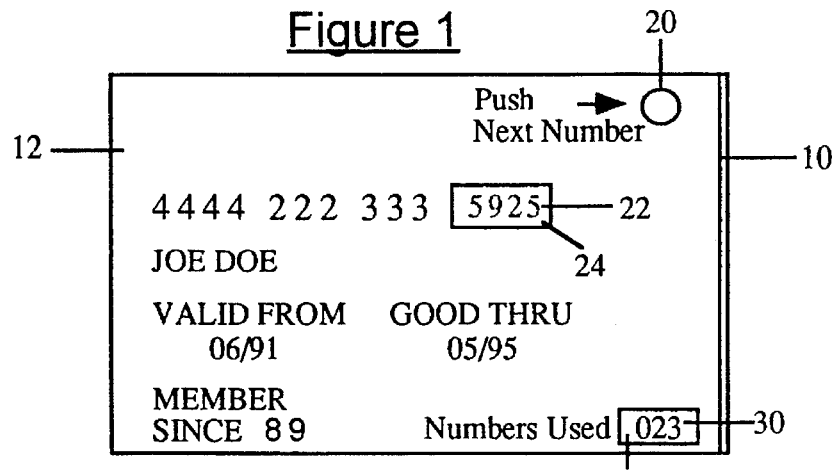
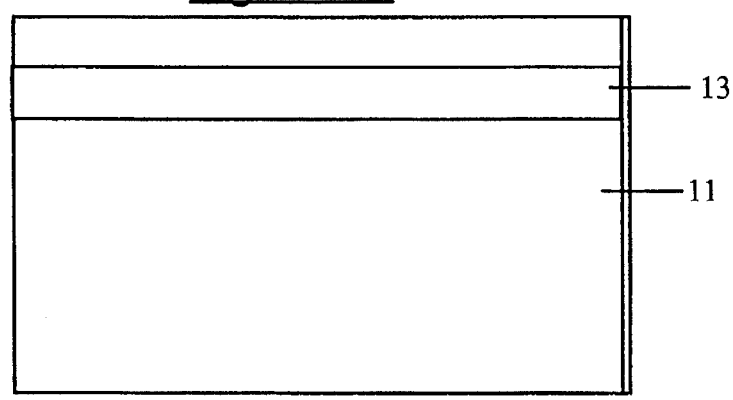
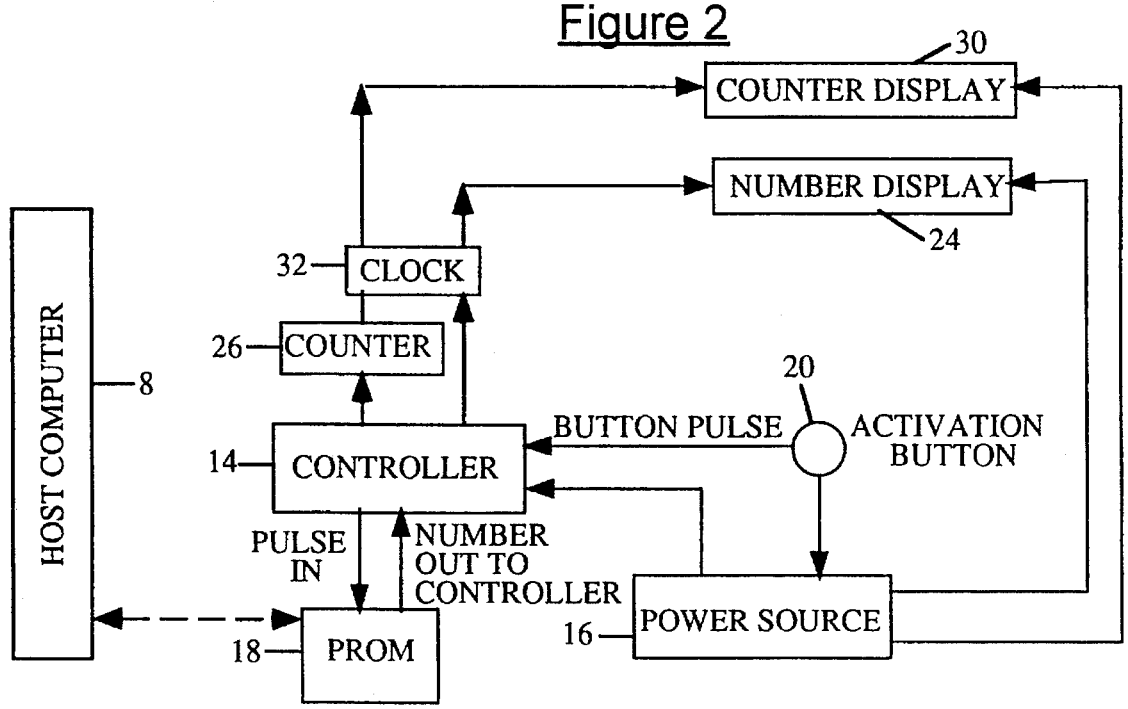

SECURE CREDIT CARD WHICH PREVENTS UNAUTHORIZED TRANSACTIONS

BACKGROUND OF THE INVENTION

1. Field of the Invention

This invention relates to credit cards, and, in particular, to a credit card which has a unique verification number for each individual transaction using the card.

2. Background Discussion

Credit cards are widely used to charge purchases, telephone calls, and a wide variety of other transactions. Typically, a credit card has displayed on it a thirteen to nineteen digit user account or code number. In some cases, such as when using automatic teller machines, the user keys into the automatic teller machine a Personal Identification Number (PIN) which is needed to authorize the transaction. Even though Personal Identification Numbers reduce unauthorized use of the card, it is still possible for an unauthorized person to obtain access to this number and use the card.

SUMMARY OF THE INVENTION

It is the objective of this invention to provide a credit card and method of use which prevents unauthorized transactions by generating a unique Personal Identification Number (PIN) with each transaction.

The credit card of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include preventing unauthorized use of the credit card, convenience of use, and simplicity of manufacture of the credit card using conventional electronic chip components.

The first feature of the secure credit card of this invention is that it includes a Programmable Read Only Memory (PROM) device which contains a series of stored randomly generated numbers, each representing a unique Personal Identification Number (PIN) for each individual transaction. These randomly generated numbers are generated by a host computer and downloaded onto the PROM. The PROM and the host computer have the same identical numbers stored in the same identical sequence. A series of random numbers provides greater security and are therefore preferred. The host computer is accessible upon use of the credit card by modem or other conventional means.

The second feature is that the credit card has an actuator which is activated each time the card is used. A switch is a suitable actuator, and it is manually activated with each use of the credit card to provide a pulsed electrical signal. This pulsed electrical signal activates a microprocessor controller which accesses the next random number in sequence from the PROM device. This next in sequence number is compared with the next in sequence number in the host computer to verify that they are identical and that the transaction is, therefore, authorized. If the numbers are not identical, the transaction cannot be completed.

The third feature is that the credit card has essentially the same appearance as conventional credit cards and is about the same width, length, and thickness. It comprises a body member usually made of a thin sheet material such as, for example, plastic, graphite epoxy, aluminum, or other metals, and the electronic components of the card are attached to or housed within this body member. For example, the credit card includes the microprocessor controller electrically coupled to the Programmable Read Only Memory device, both of which are very small electronic chip circuits embedded in the thin sheet material body member. Upon actuation, the pulse signal is forwarded to the microprocessor controller to activate the microprocessor controller to turn on the PROM device to access the next random number in sequence.

The fourth feature is a counter connected to the microprocessor controller which counts the number of pulse signals received to count each use of the credit card. Preferably, a display device in the body member is connected electrically to the counter. The display device displays the number of pulsed signals received.

The fifth feature is a display device on the card that displays the next random number in sequence from the PROM device each time the pulsed signal is received. A conventional liquid crystal display device is preferred. Preferably, a clock or timer is used to clear the display after a predetermined time period has elapsed.

This invention also includes a method of verifying the validity of a credit card with each use of the credit card. This method includes the following steps:

(a) providing a host computer in which is stored a series of numbers in a predetermined sequence, said host computer being accessible with each use of the credit card, (b) providing a credit card including a storage device programed with the identical series of numbers in the identical predetermined sequence as the series of numbers in said host computer, said storage device providing the next number in said series with each use of the credit card, (c) using the credit card to actuate said storage device to generate the next number in said sequence, and (d) comparing said number provided upon the use of the credit card with the next number in sequence as indicated by the host computer.

Thus, if the random number with the use of the credit card does not match the random number in sequence as indicated by the host computer, the transaction is not valid.

DESCRIPTION OF THE DRAWING

The preferred embodiment of this invention, illustrating all its features, will now be discussed in detail. This embodiment depicts the novel and non-obvious credit card and method of this invention as shown in the accompanying drawing, which is for illustrative purposes only. This drawing includes the following figures (FIGS.), with like numerals indicating like parts:

FIG. 1 is a plan view showing the front face of the credit card of this invention.

FIG. 1A is a plan view showing the back of the credit card of this invention.

FIG. 2 is schematic wiring diagram showing the principle electronic components contained within or attached to the credit card shown in FIG. 1.

DETAILED DESCRIPTION OF THE PREFERRED EMBODIMENT

The secure credit card 10 of this invention depicted in FIG. 1 is typical in some respects to conventional credit cards. It has a thin sheet material body 12 with a approximate length, width, and thickness of a standard credit card. There can be up to a nineteen digit identification user code or account number on the face of the card 10 identifying the user. In this case 4444 222 333. As shown in FIG. 1A, the back 11 of the card 10 has a conventional magnetic strip 13 encoded with the same account number appearing on the face of the card,i. e., 4444 222 333.

Unlike conventional credit cards, the card 10 has the circuit shown in FIG. 2 encased within the card. Imbedded within the card 10 is a microprocessor controller 14, a power source 16, and a Programmable Read Only Memory (PROM) device 18 storing random numbers. There is a push button switch 20 in the upper left hand corner of the card 10, which when depressed creates a pulsed electrical signal that activates the microprocessor controller 14. When the switch is activated, the microprocessor controller 14 accesses the PROM device 18, and the next Personal Identification Number (PIN) is displayed in a window 22 in the card 10. Within the window 22 is a liquid crystal display device 24 which displays, for example, a Personal Identification Number of four digits. In this case 5925.

There is a counter 26 connected to the microprocessor controller 14 which counts each time the card is used and a counter display window 28 which shows a count of the total number of random numbers used. The PROM device 18 of each individual card 10 will be programmed with a random series of numbers in a known predetermined sequence by a host computer 8. The random Personal Identification Numbers and their sequence will be identical to numbers stored in the host computer which is accessed each time the card 10 is used.

The four digit Personal Identification Number 5925, in combination with the identification user code or account number 4444 222 333, is transmitted to the host computer which verifies that the transaction is a valid, authorized transaction, provided the Personal Identification Number 5925, and sequence number matches the Personal Identification Number and sequence number in the host computer's memory. When the push button switch 20 is activated, the electrical pulse generated is forwarded to the microprocessor controller 14. The controller 14 then activates the PROM device 18 which displays the Personal Identification Number in window 22, for example, 5925, on display device 24.

A conventional clock or timer 32 is activated for a predetermined time period, for example, 30 to 60 seconds each time the card is used. When this time period has elapsed, the timer 32 is automatically turned off and the Personal Identification Number is cleared from the window 22. The total number of transactions as indicated in the counter display window 28 shows that the Personal Identification Number 5925 was the twenty-third transaction. The Personal Identification Number, in this 5925, is then transmitted to the host computer which keeps track of the sequence of random Personal Identification Numbers used. This information can be forwarded to the host computer in any conventional manner such as simply a telephone call or forwarding the information via a modem. If the Personal Identification Number, for example, 5925, does not match the next random Personal Identification Number in sequence in the host computer, the transaction will not be authorized. In addition, the host computer will scan through its data base of stored Personal Identification Numbers until it matches a number in its data base with the Personal Identification Number provided by the PROM device 18. The host computer will invalidate any intermediate Personal Identification Numbers so that they will be unusable, and then authorize the transaction. If no match is found, then the transaction will not be authorized.

If for some reason the actuating button switch 20 is pressed accidentally, the host computer can be informed and the random number or numbers so generated removed, or made unusable, so that no transaction can be charged against this inadvertently used number or numbers. If the card 10 is lost, the company issuing the credit card can be informed immediately like any other credit card to prevent any further use of the card. This card 10 completely eliminates the possibility that the transaction number can fall into the hands of unauthorized persons, since each transaction will have a unique number associated with it.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

We claim:

1. A secure credit card including a body member to which is attached to a microprocessor controller which is electrically coupled to a programmable read only memory device programmed with a series of random numbers in a predetermined sequence, said random numbers being identical to random numbers in a host control computer and in the identical sequence as the random numbers in the host computer, said host computer being accessible upon each use of the credit card, said programmable read only memory device accessing the next random number in sequence with each use of the credit card to permit verification by comparing the number provided by said programmable read only memory device with each use of the credit card with the next random number in sequence as indicated by the host computer, a switch actuated with each use of the credit card that provides a pulse signal that is forwarded to the microprocessor controller and activates the microprocessor controller to access the programmable read only memory device to provide the next random number in the sequence, a counter connected to the microprocessor controller which counts the number of pulse signals received to count each use of the credit card, and a display device in the body member connected electrically to the programmable read only memory device, said display device displaying the next random number in the sequence each time a pulse is received.

* * * * *